United States Patent [19]

Nimer et al.

[11] Patent Number: 4,496,659

[45] Date of Patent: Jan. 29, 1985

[54] SULFUR CEMENT-AGGREGATE COMPOSITIONS AND METHODS FOR PREPARING

[75] Inventors: Edward L. Nimer, San Rafael; Robert W. Campbell, Lafayette, both of Calif.

[73] Assignee: Chevron Research Company, San Francisco, Calif.

[21] Appl. No.: 579,327

[22] Filed: Feb. 13, 1984

Related U.S. Application Data

[63] Continuation-in-part of Ser. No. 414,716, Sep. 3, 1982, abandoned.

[51] Int. Cl.³ .............................................. C04B 19/06
[52] U.S. Cl. ................................. 501/140; 106/287.32
[58] Field of Search .................... 501/140; 106/287.32

[56] References Cited

U.S. PATENT DOCUMENTS

| | | | |
|---|---|---|---|
| 3,440,064 | 4/1969 | Ludwig | 106/287.32 |
| 4,332,911 | 6/1982 | Nimer et al. | 501/140 |
| 4,332,912 | 6/1982 | Albom | 501/140 |
| 4,376,831 | 3/1983 | Woo | 501/140 |

Primary Examiner—James Poer
Attorney, Agent, or Firm—S. R. LaPaglia; T. G. DeJonghe; L. S. Squires

[57] ABSTRACT

Sulfur cement-aggregate compositions comprising a sulfur cement and an aggregate containing an expansive clay and processes for preparing such compositions. The processes, and resulting compositions, are characterized by the incorporation of a carboxylic acid therein. The resulting solidified composition has improved water stability.

The compositions can be used as mortars or concretes depending on the particle size of the principal aggregate component.

17 Claims, No Drawings

SULFUR CEMENT-AGGREGATE COMPOSITIONS AND METHODS FOR PREPARING

CROSS REFERENCE TO RELATED APPLICATION

This application is a continuation-in-part of U.S. Application Ser. No. 414,716, filed Sept. 3, 1982, now abandoned.

BACKGROUND OF THE INVENTION

This invention relates to sulfur cement-aggregate compositions. In a further aspect, the invention relates to sulfur mortars and concretes containing an aggregate which is contaminated with a water-expansive clay.

Sulfur mortars and concretes generally refer to a mixture of sulfur and aggregate wherein the sulfur functions as the cement or binder. Generally, whether a composition is classed as a mortar or concrete is based on the particle size of the predominate aggregate. Thus, compositions containing larger sized aggregates are generally referred as concretes whereas compositions containing smaller sized aggregate are referred to as mortars. In either case, the compositions can also contain very fine particle size aggregates, such as fly ash, etc., as fillers. Sulfur mortars and concretes are prepared by heating sulfur with an aggregate at a sufficient temperature to render the sulfur molten and then allowing the mixture to cool to solidify the sulfur. Not infrequently, the sulfur also contains a plasticizer which desirably increases the cold plasticity crystallization time of the sulfur, probably by reacting with at least a portion of the sulfur. Such sulfur is referred to as plasticized sulfur.

Sulfur mortars and concretes can be broadly classified as sulfur cement products. Sulfur cement is similar to Portland cement in forming concretes or mortars. In the latter case, a mixture of Portland cement and aggregate is solidified into a final solid product by treatment with water. In the case of sulfur products, heat is used to render the sulfur cement molten, which, upon cooling, solidifies, binding the aggregate.

Sulfur cement concretes can be used for many of the same purposes as conventionally formed concretes. For example, sulfur concretes can be used for structural members, roads, slabs, curbings, gutters, and can be precast or cast at the job site. Sulfur cement concrete affords a significant advantage over Portland cement concrete, especially in the case of preformed articles, in that the sulfur cement concrete can be remelted and recast. Thus, when defective or surplus articles are prepared, the sulfur aggregate composition can be reused by merely melting down the article and recasting the composition. Suflur cement mortars can be used for similar purposes as Portand cement mortars, such as, for example, bonding structural members together. Sulfur cement mortars and concretes also generally have good corrosion resistance to acids and other chemicals.

U.S. Pat. No. 3,440,064 discloses sulfur compositions and teaches that incorporation therein of styrene or an alkyl mercaptan in combination with a broad range of other additives, including certain unsaturated carboxylic acids improves flame retardancy.

Sulfur cement mortars and concretes are well-known to the art and various modifications are, for example, described in the patent literature, for example, U.S. Pat. Nos. 2,135,747, 3,954,480, 4,025,352, 4,058,500, and 4,118,230.

One of the disadvantages of sulfur cement mortars and concretes is that the presence of small amounts of water-expansive clay (for example, 1% by weight or more) in the aggregate causes the solidified sulfur cement mortars and concretes to disintegrate when exposed to water. This problem is particularly serious since, because of transportation costs, economic necessity usually requires the use of aggregate sources close to the casting or job site, regardless of the presence of expansive clay. The expansive clay can be removed from the aggregate by washing procedures but such procedures are also generally inconvenient and uneconomical. Thus, if the local sources of aggregate contain expansive clay, the use of sulfur cement mortars and concretes is pragmatically severely restricted.

U.S. Pat. No. 4,188,230 teaches that this problem may be obviated by the incorporation of petroleum or polyol additives. Such procedures have not, in fact, proved entirely satisfactory. The problem of water-expansive clays was also considered in an article by Shrive, Gillott, Jordaan and Loov, appearing at Page 484 of the *Journal of Testing and Evaluation* (1977). In this article, the results of certain experiments with water-expansive clays are described. In these experiments, a mixture containing 3 parts, by volume, fly ash, and 2 parts bentonite clay were slurried with water. Batches of this slurry were, respectively, mixed with aqueous solutions containing 1% and 5% by weight calcium hydroxide or potassium chloride and allowed to stand overnight. Sulfur cement samples were prepared by slowly adding the slurries (to evaporate water) to molten sulfur. The final samples contained 75:15:10 parts by volume of sulfur:fly ash:bentonite clay. Samples of the treated and untreated materials were immersed in water after setting for 1 day and 7 days. Both the treated and untreated samples disintegrated within 3 or 4 hours of immersion and accordingly the investigation was discontinued.

U.S. Pat. Nos. 4,332,911 and 4,332,912 disclose methods for increasing the water stability of sulfur cement-aggregate compositions containing water-expansive clay, which comprises adding particulate soluble salts to the aggregate or treating the aggregate with salt solutions.

SUMMARY OF THE INVENTION

It has now been discovered that the water stability of sulfur cement-aggregate compositions containing aggregate having up to about 5% expansive clay based on the weight of the aggregate is very substantially improved by the incorporation of an effective amount of a carboxylic acid. This invention is very significant to the commercialization of sulfur cement mortars and concretes, because the treatment is effective and merely requires the addition of a small amount of the carboxylic acid to the aggregate. Further, the invention has broad applicability, because most aggregate contains less than 5% by weight of expansive clay and most generally contain less than about 3% by weight.

In one embodiment, the invention comprises a sulfur cement-aggregate composition, comprising sulfur cement and an aggregate, containing up to about 5% by weight and preferably less than about 4% by weight, based on the aggregate, of an expansive clay and in admixture with said aggregate an amount of a carboxylic acid effective to substantially reduce the water expandability of said expansive clay.

In another embodiment, the invention provides a process for preparing a sulfur cement and aggregate composition containing an aggregate having up to 5% by weight, based on the aggregate, of expansive clay which comprises the improvement of adding to said aggregate an amount of a carboxylic acid effective to substantially reduce the water expandability of said expansive clay.

The invention will be further described hereinbelow.

FURTHER DESCRIPTION OF THE INVENTION AND PREFERRED EMBODIMENTS

The present composition can be prepared by simply adding an effective amount of the carboxylic acid to the sulfur cement-aggregate composition, or either component, prior to solidification. The components can be admixed together in a single step or if desired, the acid can be better distributed throughout a given component by a separate mixing step with that component prior to the final mixing step.

Where plasticized sulfur is used as the cement, it is generally preferred to add the plasticizer to the sulfur before adding the aggregate. Also, as is conventional, it is preferred to heat the aggregate prior to admixture with the molten sulfur cement to remove moisture, avoid random cold spots and generally improve bonding of the sulfur cement to the aggregate. The sulfur cement and aggregate, including any other ingredients, are mixed together at temperatures above the melting point of sulfur or plasticized sulfur and below the decomposition or boiling point of the materials. Typically, such mixing is conducted at temperatures in the range of about from 110° to 180° C. and preferably, from about 125° to 160° C. The molten mixture can then be cast into the desired shape or form, for example, in the case of concrete, or applied in the case of mortar. Upon cooling, the composition solidifies into a final product having improved water stability.

In accordance with the practice of the present invention, about from 0.05 to 0.5 g-mol, preferably about from 0.10 to 0.30 g-mol, of carboxylic acid is typically used per kilogram of expansive clay-containing aggregate. In terms of a more convenient weight-to-weight basis, generally about from 0.005 to 0.05 parts by weight, preferably about from 0.008 to 0.030 parts by weight of the carboxylic acid are used per part by weight of expansive clay-containing aggregate. Optimum concentrates may vary with the particular carboxylic acid used and can be determined by routine optimization experimentation.

Suitable carboxylic acids which can be used include saturated and unsaturated, aliphatic and alicyclic carboxylic acids, and aromatic carboxylic acids and include monocarboxylic, dicarboxylic and polycarboxylic acids. Suitable carboxylic acids thus include, for example: formic acid, acetic acid, propionic acid, butyric acid, valeric acid, isovaleric acid, pivalic acid, caproic acid, caprylic acid, capric acid, lauric acid, myristic acid, palmitic acid, stearic acid, oleic acid, linoleic acid, linolenic acid, oxalic acid, malonic acid, succinic acid, glutaric acid, adipic acid, pimelic acid, suberic acid, azelaic acid, sebacic acid, acrylic acid, propiolic acid, methacrylic acid, crotonic acid, isocrotonic acid, oleic acid, elaidic acid, maleic acid, fumaric acid, citraconic acid, mesaconic acid, cyclohexanecarboxylic acid, phenylacetic acid, benzoic acid, o-toluic acid, m-toluic acid, o-chlorobenzoic acid, m-chlorobenzoic acid, o-bromobenzoic acid, m-bromobenzoic acid, o-nitrobenzoic acid, m-nitrobenzoic acid, salicylic acid, anthranilic acid, m-aminobenzoic acid, o-methoxybenzoic acid, m-methoxybenzoic acid, furoic acid, thenoic acid, nicotinic acid, isonicotinic acid, and the like, and compatible mixtures thereof.

To minimize evaporation losses, it is preferred that the carboxylic acid have a boiling point above about 110° C. and preferably above about 125° C. Generally, it is preferred to use less expensive carboxylic acids and typically the acid used will have from 2 through 12 carbon atoms, more typically 2 through 7 carbon atoms, and generally will be an alkanoic, alkanedioic, alkenoic, or alkenedioic acid. Typically, best results in terms of enhanced water stability are obtained using dicarboxylic acids, preferably alkanedioic and alkenedioic acids, and especially ethanedioic acid (i.e., oxalic acid), and cis-butenedioic acid (i.e., maleic acid).

The remaining components of the sulfur cement-aggregate compositions are not unique to the present invention save that the present invention permits the use of aggregate containing an otherwise deleterious amount of expansive clay up to about 5% weight, based on the aggregate, to produce a product having excellent water resistance. The improvement in stability afforded by the incorporation of the carboxylic acid is especially outstanding where the aggregate contains about from 1 to 4% by weight expansive clay. Also, better water stabilities are obtained using a sulfur cement containing plasticized sulfur than are obtained with pure sulfur.

The sulfur cement used in the present compositions can be unaltered sulfur and/or plasticized sulfur and if desired can contain minor amounts of various compatible additives (e.g., flame retardants, ductilating agents, etc.). The term "plasticized sulfur" refers to the reaction product of sulfur with a plasticizer and/or mixtures of sulfur and plasticizers and/or the reaction product of sulfur with a plasticizer. (Sulfur content (or total sulfur) as used herein includes both unreacted sulfur and the sulfur content of such reaction products.) Although it is not wholly necessary to use plasticized sulfur as the sulfur cement, the compositions of invention using plasticized sulfur generally have much superior water stability to the corresponding composition using sulfur without a plasticizer. Where a plasticizer is used, the amount of the plasticizer(s) will vary with the particular plasticizer and the properties desired in the cement. The cement can contain about from 0.1 to 10% of the plasticizer and typically will contain about from 2 to 7%, preferably about 2½ to 5%, by weight of the plasticizer, based on the weight of total sulfur.

The term "sulfur plasticizer" or "plasticizer" refers to materials or mixtures of materials which, when added to sulfur, lower its melting point and increase its crystallization time. One convenient way to measure the rate of crystallization is as follows: The test material (0.040 g) is melted on a microscope slide at 130° C. and is then covered with a square microscope slide cover slip. The slide is transferred to a hot plate and is kept at a temperature of 70°±2° C., as measured on the glass slide using a surface pyrometer. One corner of the melt is seeded with a crystal of test material. The time required for complete crystallization is measured. Plasticized sulfur, then, is sulfur containing an additive which increases the crystallization time within experimental error, i.e., the average crystallization time of the plasticized sulfur is greater than the average crystallization time of the elemental sulfur feedstock. For the present application, plasticizers are those substances which, when added to molten elemental sulfur, cause an increase in crystallization time in reference to the elemental sulfur itself.

Inorganic plasticizers include, for example, the sulfides of iron, arsenic and phosphorus, etc. Generally, the preferred plasticizers are organic compounds which react with sulfur to give sulfur-containing materials.

Suitable sulfur plasticizers which can be used include, for example, aliphatic polysulfides, aromatic polysulfides, styrene, dicyclopentadiene, dioctylphthalate, acrylic acid, epoxidized soybean oil, triglycerides, tall oil fatty acids, and the like, and compatible mixtures thereof.

Although styrene can be used as a plasticizer, we disclaim compositions containing styrene or alkene mercaptans in deference to the flame retardant composition disclosed in U.S. Pat. No. 3,440,064.

One class of preferred plasticizers is the aliphatic polysulfides, particularly those that will not form crosslinking. Thus, butadiene is not a preferred constituent to form the aliphatic polysulfide, as it may form cross-linking sulfur bonds, whereas dicyclopentadiene is a preferred compound for forming the aliphatic polysulfide useful as the sulfur plasticizer. With molten sulfur, dicyclopentadiene forms an extremely satisfactory aliphatic polysulfide.

Another class of preferred plasticizers for use in the composition of the present invention are aromatic polysulfides formed by reacting 1 mol of an aromatic carbocyclic or heterocyclic compound, substituted by at least one functional group of the class -OH or -NHR in which R is H or lower alkyl with at least 2 mols of sulfur.

Suitable organic compounds of this type include: phenol, aniline, N-methyl aniline, 3-hydroxy thiophene, 4-hydroxy pyridine, p-aminophenol, hydroquinone, resorcinol, meta-cresol, thymol, 4,4'-dihydroxy biphenyl, 2,2-di(p-hydroxyphenol) propane, di(p-hydroxyphenyl) methane, etc., p-phenylene diamine, methylene dianiline. Phenol is an especially preferred aromatic compound to form the aromatic polysulfide.

The aromatic polysulfides are generally prepared by heating sulfur and the aromatic compound at a temperature in the range of 120° to 170° C. for 1 to 12 hours, usually in the presence of a base catalyst such as sodium hydroxide. (See for example, Angew, Chem. Vol. 70, No. 12, Pages 351-67 (1958). The polysulfide product made in this way has a mol ratio of aromatic compound: sulfur of the 1:2 to 1:10, preferably from 1:3 to 1:7. Upon completion of the reaction, the caustic catalyst is neutralized with an acid such as phosphoric or sulfuric acid. Organic acids may also be used for this purpose. The resulting aromatic polysulfide may be used immediately or it may be cooled and stored for future use.

Another type of aliphatic polysulfide useful as a plasticizer for this invention are the linear aliphatic polysulfides. Although these polysulfides may be used alone as the sulfur plasticizer, it is preferred to use them in combination with either (a) dicyclopentadiene or (b) the aromatic polysulfides described above, especially with the phenol-sulfur adduct. In this connection, the preferred plasticizer mixtures contain from 5 to 60% by weight linear aliphatic polysulfide, based on total plasticizer, preferably about 20 to 50% by weight.

These aliphatic polysulfides may have branching indicated as follows:

wherein x is an integer of from 2 to 6 and wherein B is H, alkyl, aryl, halogen, nitrile, ester or amide group. Thus, in this connection the aliphatic polysulfide is preferably a linear polysulfide. The chain with the sulfur preferably is linear, but it can have side groups as indicated by B above. Also, this side group B may be aromatic. Thus, styrene can be used to form a phenyl-substituted linear aliphatic polysulfide. The preferred aliphatic polysulfides of this type are both linear and nonbranched.

Unbranched linear aliphatic polysulfides include, for example, those containing an ether linkage and having the recurring unit:

—$S_x$CH$_2$CH$_2$OCH$_2$OCH$_2$CH$_2$$S_x$— wherein x has an average value of about 12. The ether constituent of this aliphatic polysulfide is relatively inert to reaction. Other suitable aliphatic polysulfides having the following recurring units:

- 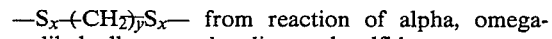 from reaction of alpha, omega-dihaloalkanes and sodium polysulfide;
- 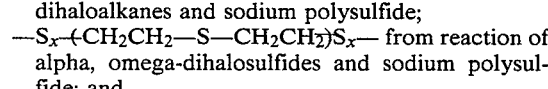 from reaction of alpha, omega-dihalosulfides and sodium polysulfide; and
- 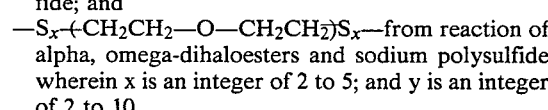 from reaction of alpha, omega-dihaloesters and sodium polysulfide wherein x is an integer of 2 to 5; and y is an integer of 2 to 10.

In some instances, it is preferred to use mixtures of materials having different reactivities with sulfur as the plasticizer. For example, very good results can be obtained using a mixture of cyclopentadiene and/or dicyclopentadiene with oligomers of cyclopentadiene. Various plasticizers are also described in the art, for example, see U.S. Pat. Nos. 4,058,500 and 4,190,460.

The sulfur cement can also contain very fine particle sized fillers such as, for example, fly ash, talc, mica, silicas, graphite, carbon black, pumice, insoluble salts (e.g., barium carbonate, barium sulfate, calcium carbonate, calcium sulfate, magnesium carbonate, etc.), magnesium oxide, and mixtures thereof. Such fillers typically have a particle size less than 100 mesh (U.S.A. Standard Testing Sieves) and preferably, less than 200 mesh. Such fillers generally act as thickening agents and generally improve the hardness or strength of the sulfur cement product. Where fillers are used, the sulfur cement typically contains about from 1 to 15% by weight, and more generally, about from 5 to 10% of the filler, based on the weight of total sulfur.

Various other additives can be added as desired to alter various properties of the sulfur cement, as is well-known to the art; see, for example, U.S. Pat. Nos. 4,188,230 (durability altered by the addition of certain petroleum products); and 4,210,458 (viscosity altered by the addition of polyhydric alcohols).

The principal sub-genuses of the present composition are sulfur cement mortars and suflur concretes. The two compositions are actually very substantially the same with the exception of the size of the principal aggregate component. Typically, in the case of the present sulfur cement mortars, the mortar contains about from 10 to 50% by weight, preferably about from 15 to 25% by weight, of sulfur cement and about from 50 to 90% by weight, preferably about from 75 to 85% by weight, small sized aggregate. Typically, small sized aggregate generally has a particle size less than about No. 8 mesh (U.S.A. Standard Testing Sieves), and about 50 to 100%, preferably less than about 16 mesh (U.S.A. Standard Testing Sieves). Suitable small size aggregate include plaster sand, Kaiser top sand, Monterey sand, Vulcan sands, etc., and the like, and mixtures thereof.

The sulfur cement concretes are similar to the sulfur cement mortars except large sized aggregate is used along with or in place of all or a portion of the small size aggregate. Typically, the large sized aggregate has a particle size of about from No. 4 to 1½ inches, preferably about from ⅜ to ¾ inches. The small sized aggregate generally has a particle size below about No. 8 mesh (U.S.A. Standard Testing Sieves) and preferably, below 16 mesh and preferably predominantly, greater than 40 mesh. Suitable examples of such small sized aggregate have already been illustrated hereinabove with respect to the sulfur cement mortar of the present invention.

Typically, the sulfur cement concrete comprises, by weight, about from 10 to 50% total sulfur cement; 20 to 60% large sized aggregate; and 30 to 70% small sized aggregate. The sulfur cement preferably and typically contains about from 2 to 7% by weight plasticizer based on the weight of sulfur and can also contain fillers and other additives.

As used herein, the term "mesh" are measured in and refers to the "U.S.A. Standard Testing Sieves" system also known as "U.S. Sieve Series".

A further understanding of the invention can be had from the following non-limiting examples.

EXAMPLE 1

This example illustrates the composition and process of the invention, and the improved water stability afforded by the present invention.

A control sulfur cement-aggregate composition containing 25% by weight plasticized sulfur (95% by weight sulfur, 2.5% by weight dicyclopentadiene and 2.5% by weight cyclopentadiene oligomer); 3.0% by weight bentonite clay (4.0% based on aggregate); and the remainder Kaiser top sand having a U.S.A. Standard Testing Sieves mesh size range of No. 4 to 100 was prepared by oven drying the bentonite clay and then mixing the requisite amount of clay with the sand. The clay-sand (1,500 g) mixture was then preheated to about 130° C. and then mixed with the molten plasticized sulfur (500 g) at about 130° C. The composition was cast into three 2"×4" cylinders and aged overnight at room temperature (about 20° C.).

Test compositions illustrating the present invention were prepared following the same general procedure and using the same components and approximate relative concentrations but in this instance 20 g of the plasticized sulfur is replaced with 20 g of the particular acid indicated in Table 1 hereinbelow. The test compositions were prepared in the same manner as the control composition with the exception of the addition of the acid to the plasticized sulfur prior to mixing with the aggregate. The test compositions were then cast into three 2"×4" (5.08 cm×10.16 cm) cylinders and aged overnight in the same manner as the control composition. Each test composition sample was prepared using 480 g of the sulfur cement, 1,440 g of sand and 60 g of bentonite clay plus 20 g of the acid indicated in Table 1 below.

The control and test cylinders were, respectively immersed in tap water at room temperature (about 20° C.). The immersed cylinders were visually inspected daily for fractures, cracks, crumbling, etc. At the first evidence of any of these, the cylinder was considered to have failed. The days to failure of the control and test cylinders is reported hereinbelow in Table 1 as the average of the three cylinders tested for each composition.

As can be seen from Table 1, the compounds of the present invention had greatly superior water stability as compared to the corresponding control composition. The control composition had a life of about 6 hours in water whereas the compositions of the present invention had water stabilities of at least 14 days and the compositions of the invention using the dicarboxylic acids had water stabilities of at least 118 days.

TABLE 1

| ACID | GRAMS ACID | GRAMS CARBOXYLIC ACID PER 1000 G AGGREGATE* | G-MOL CARBOXYLIC ACID PER 1000 G AGGREGATE* | % WT. CLAY IN AGGREGATE* | DAYS TO FAILURE*[1] |
|---|---|---|---|---|---|
| Control | 0 | — | — | 4.0 | about 6 hours |
| Acetic | 20 | 13.33 | 0.22 | 4.0 | 29 |
| Acrylic | 20 | 13.33 | 0.18 | 4.0 | 14 |
| Maleic | 20 | 13.33 | 0.11 | 4.0 | 142 |
| Oxalic | 20 | 13.33 | 0.22 | 4.0 | 118 |

*Aggregate = sand + clay
*[1] Average value of three cylinders

Obviously, many modifications and variations of the invention described hereinabove and below can be made without departing from the essence and scope thereof.

What is claimed is:

1. A sulfur cement and aggregate composition which comprises a sulfur cement, an aggregate, contaminated with up to 5% by weight of an expansive clay, and an amount of a carboxylic acid, selected from the group of acetic acid, dicarboxylic acids, and mixtures thereof, effective to substantially reduce the water expandability of said expansive clay and wherein said carboxylic acid has a boiling point above about 110° C. and is dispersed throughout said aggregate, with the proviso that said composition does not contain styrene or an alkene mercaptan.

2. The composition of claim 1 wherein said acid is selected from the group consisting of the group of carboxylic acids having 2 through 12 carbon atoms, and mixtures thereof.

3. The composition of claim 2 wherein said acid is selected from the group consisting of alkanedioic acids, alkenedioic acids, and mixtures thereof.

4. The composition of claim 1 wherein said acid is selected from the group consisting of acetic acid, oxalic acid, maleic acid, and mixtures thereof.

5. The composition of claim 4 wherein said acid is selected from the group consisting of oxalic acid, maleic acid, and mixtures thereof.

6. The composition of claim 1 wherein said acid has at least two carboxy groups.

7. The composition of claim 1 wherein said composition comprises about from 0.05 to 0.5 g-mol of said acid per kg of said expansive clay-contaminated aggregate.

8. The composition of claim 1 wherein said sulfur cement comprises plasticized sulfur.

9. The composition of claim 8 wherein said plasticized sulfur is plasticized with a mixture of dicyclopentadiene and oligomers of cyclopentadiene.

10. The composition of claim 1 wherein said composition comprises about from 15 to 20% by weight of said sulfur cement and about from 80 to 85% by weight of said aggregate.

11. The composition of claim 9 wherein said sulfur cement comprises a powdered filler material.

12. The composition of claim 1 wherein said composition is a sulfur cement mortar wherein a major portion of said aggregate has a weight average particle size in the range of about from 8 to 16 mesh.

13. The composition of claim 1 wherein said composition is a sulfur cement concrete wherein a major portion of said aggregate has a weight average particle size in the range of about from 8 mesh to $\frac{3}{4}$ inches.

14. The composition of claim 1 wherein said aggregate is contaminated with less than about 4 percent by weight of said expansive clay.

15. The composition of claim 1, wherein said aggregate is contaminated with from 1 to 4%, by weight, of said expansive clay.

16. A sulfur cement and aggregate composition consisting essentially of an aggregate, contaminated with up to 5% by weight of expansive clay; a sulfur cement selected from the group of unaltered sulfur; sulfur plasticized with a sulfur plasticizer selected from the group consisting of dicyclopentadiene, oligomers of cyclopentadiene, and mixtures thereof, and mixtures of said sulfur and said plasticized sulfur; and an amount of a carboxylic acid selected from the group of acetic acid, dicarboxylic acids and mixtures thereof effective to substantially reduce the water expandability of said expansive clay and wherein said carboxylic acid has a boiling point above about 110° C. and is dispersed throughout said aggregate, with the proviso that said composition does not contain styrene or an alkene mercaptan.

17. The composition of claim 16 wherein said plasticizer is a mixture of dicyclopentadiene and oligomers of cyclopentadiene.

* * * * *